(12) United States Patent
Reeve et al.

(10) Patent No.: US 11,456,933 B2
(45) Date of Patent: Sep. 27, 2022

(54) GENERATING AND UPDATING A PERFORMANCE REPORT

(71) Applicant: International Business Machines Corporation, Armonk, NY (US)

(72) Inventors: John Anthony Reeve, Winchester (GB); Robert Convery, Fair Oak (GB); Matthew Bailey, Basingstoke (GB); Ashley Donald Harrison, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/075,961

(22) Filed: Oct. 21, 2020

(65) Prior Publication Data
US 2022/0124014 A1 Apr. 21, 2022

(51) Int. Cl.
*H04L 43/06* (2022.01)
*H04L 43/50* (2022.01)
(Continued)

(52) U.S. Cl.
CPC .......... *H04L 43/06* (2013.01); *H04L 43/0894* (2013.01); *H04L 43/50* (2013.01); *H04L 67/535* (2022.05)

(58) Field of Classification Search
CPC ..... H04L 43/06; H04L 43/0894; H04L 43/50; H04L 43/065; H04L 43/04; H04L 43/12;
(Continued)

(56) References Cited

U.S. PATENT DOCUMENTS

| 9,348,735 B1 * | 5/2016 | Cohen | ................ G06F 11/34 |
| 10,372,600 B2 | 8/2019 | Mathur | |

(Continued)

FOREIGN PATENT DOCUMENTS

| AU | 2015101031 A4 | 3/2016 | |
| CN | 106294706 A * | 1/2017 | ............. G06F 16/25 |

(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Glenton B Burgess
*Assistant Examiner* — Rachel J Hackenberg
(74) *Attorney, Agent, or Firm* — Peter K. Suchecki

(57) ABSTRACT

A computer-implemented method for generating and updating a performance report for a system adapted to run a plurality of flows, which enables the performance data of individual running flows to be compared to flows with a similar function. This is achieved by linking each of the running flows to one of a plurality of templates which describes a function of a flow. Each template may have an associated performance summary generated for it, based on the performance data of the running flows linked to the template. A performance report can be generated from a plurality of the performance summaries. The performance report can then be updated by running a plurality of test flows on the spare capacity of the system, while obtaining test performance data from the test flows. The test performance data can be compared to performance data of running flows on the system linked to the template.

15 Claims, 7 Drawing Sheets

(51) Int. Cl.
*H04L 43/0894* (2022.01)
*H04L 67/50* (2022.01)

(58) Field of Classification Search
CPC ..... H04L 43/028; H04L 43/026; H04L 43/08; H04L 67/22; H04L 67/16; H04L 67/535
See application file for complete search history.

(56) References Cited

U.S. PATENT DOCUMENTS

| | | | | |
|---|---|---|---|---|
| 2007/0064598 | A1* | 3/2007 | Nooner | G06Q 20/3678 370/229 |
| 2007/0133522 | A1* | 6/2007 | Morgan | H04L 43/06 370/352 |
| 2013/0326055 | A1* | 12/2013 | Chatterjee | H04L 43/08 709/224 |
| 2016/0034474 | A1* | 2/2016 | Rogers | G06F 16/252 707/722 |
| 2017/0126823 | A1* | 5/2017 | Gagliardi | G06F 11/3006 |
| 2017/0255476 | A1* | 9/2017 | Whitney | G06F 9/451 |
| 2017/0262825 | A1 | 9/2017 | Conway et al. | |
| 2017/0300668 | A1 | 10/2017 | Bawa et al. | |
| 2018/0337840 | A1* | 11/2018 | Goyal | G06F 11/36 |
| 2020/0128047 | A1* | 4/2020 | Biswas | H04L 67/22 |
| 2020/0183947 | A1 | 6/2020 | Reeve et al. | |
| 2020/0202273 | A1* | 6/2020 | Lehmann | G06Q 10/06316 |

FOREIGN PATENT DOCUMENTS

| | | |
|---|---|---|
| CN | 106294706 A | 1/2017 |
| JP | 2015141552 A | 8/2015 |
| WO | 2005015404 A2 | 2/2005 |
| WO | 2020036590 A1 | 2/2020 |

OTHER PUBLICATIONS

International Search Report and Written Opinion, International Application No. PCT/IB2021/059235, dated Jan. 2, 2022, 9 pgs.

* cited by examiner

GENERATING AND UPDATING A PERFORMANCE REPORT

BACKGROUND

The present disclosure relates to reporting the performance of a system, and more specifically, to generating a performance report for a system configured to run a plurality of flows.

Increasingly, customers are accessing applications provided by a third party. The third-party hosts said applications and typically delivers them to the customer via the internet. This occurs in the form of software as a service (SaaS), infrastructure as a service (IaaS), and/or platform as a service (PaaS). For many applications, customers purchase a number of licenses, or a processing capacity, to be able to access the application.

The system capacity required by the customer is generally dictated by a capacity planning process. In general, the capacity planning process takes into consideration the types of processing the customer requires, and then uses sample performance data to calculate the capacity required. However, the capacity planning process usually only involves sampling the performance of a very limited set of scenarios, as the scenarios need to be manually set up for testing (or set up with limited automation). In reality, there are many aspects that can vary, such as complexity of flows, message sizes and the number of backend calls required. Due to there being so many variations, it is time consuming and difficult to get an accurate capacity requirement prediction. Therefore, a prediction of the required capacity will often include a 100% overhead to allow for prediction inaccuracy. In this case, if the prediction turns out to be accurate, a customer could end up paying for twice the amount of capacity.

SUMMARY

According to an embodiment of the present disclosure there is provided a computer-implemented method for generating a performance report for a system configured to run a plurality of flows. The method comprises obtaining performance data associated with each of a plurality of running flows on a system. The method also includes obtaining a plurality of templates, where each template describes a function of a flow. The method also includes linking each of the plurality of running flows to one of the plurality of templates which describes a function of the linked running flow. The method further includes generating, for each of one or more templates, a performance summary based on the performance data associated with each of the plurality of running flows linked to the template. The method further includes generating a performance report based on the generated one or more performance summaries.

There is proposed a concept of linking flows running on a system to templates which describe a function of flow. This enables the grouping of similar flows, and subsequently the performance of the flows can be measured and compared. As a result, a performance report may be produced in which the performance of similar flows can be seen and compared. Proposed embodiments may therefore provide context to performance data which would otherwise be unavailable, e.g., an average performance of similar flows, or a range of possible performance. Such context information may be useful for customers when assessing performance, and/or for informing changes to be made to the flow or the system on which the flow is run.

By grouping flows running on the system to templates, it may be possible to define a number of sets of flows which are similar. Performance data may then be gathered for all of the flows and compared. In this way, performance can be compared to other flows which have a function in common. By producing a performance report from the performance data, the customer can easily see how their flow compares to other, similar, flows, and may inform the customer's capacity planning process.

Some proposed embodiments may thus relate to producing a performance report which contains contextualized performance data for each of the flows running on a system. Linking of flows may be achieved by linking flows to a template which describes a function of the flow. Many flows may be linked to each template, and when performance data is obtained for each flow, performance data of flows which have a similar function may be compared. A performance summary may be produced for each template, which may for example include the average performance of each flow linked to the template, the best performance, and a list of all of the flows and their related performances.

Some proposed embodiments may thus provide the benefit of being able to supply performance data which accurately reflects the system's actual performance characteristic. In particular, accurate and contextualized performance data may be provided which can greatly improve a capacity planning process and help to avoid a variety of performance related issues (e.g., resulting from the provision of inadequate capacity). Such information may be particularly useful for a new customer planning to use the system, e.g., by providing an understanding about how much capacity they will require. By way of further example, the customer may have flows to run without generating performance numbers for the flows. The user may therefore prefer to match the flows to templates and corresponding performance numbers for other customers.

Also, a performance report produced using data and templates from many customers should preferably avoid/minimize the leakage of information from any given customer. Such information could, for example, relate to flow design, details about message rates, or other business sensitive information. To address this, embodiments may be configured to only use templates with corresponding performance numbers in a report if the data used to generate the report came from more than one customer (or possibly more than a defined number of customers). In this way, an ability to infer a single customer's usage from the performance report may be reduced or prevented.

According to some embodiments, generating a performance summary may further comprise: determining, for each of one or more templates, whether a number of running flows linked to the template satisfies a condition based on a predetermined quantity; and generating, for each of the one or more templates, the performance summary based on the performance data associated with each of the plurality of running flows linked to the template, responsive to determining the number of running flows linked to the template satisfies the condition.

Ensuring that each template has above a certain number of linked running flows may ensure that a performance summary is only produced if there is enough data to provide meaningful comparisons. In this way, anomalous data may have a reduced impact.

According to some embodiments, obtaining performance data may comprise: obtaining, for each of the plurality of running flows, one or more selected from the group consisting of: a latency of the running flow; a data rate per second of the running flow; a cost of the running flow; and a time at which the running flow was executed on the system. Latency, data rate, and cost may thus be used to provide a measure of performance of each running flow. By recording the time at which the flow was running on the system, the performance summary may compare running flows occurring at a specific time of day and provide information about bottlenecks to further inform the capacity planning process. It will be appreciated that other performance metrics may be used.

According to some embodiments, the performance summary may comprise one or more selected from the group consisting of: an average of the performance data of the plurality of running flows linked to the template; a range of the performance data of the plurality of running flows linked to the template; and a list of one or more of the performance data of the plurality of running flows linked to the template.

By processing the data of all of the running flows linked to a template, further context may be given to the performance of individual running flows. For example, if the performance of a given flow is much lower than that of the average of all of the running flows linked to the template, then this may indicate the need for a greater capacity.

According to some embodiments, linking each of the plurality of running flows may comprise: determining, for each of the plurality of running flows, the template in the plurality of templates that most closely describes the function of the running flow; and linking each of the plurality of running flows to one of the plurality of templates based on the determination.

By ensuring that the running flow is linked to a template which best describes the function of the flow, the data from each of the running flows may be compared to other running flows which are similar. This may provide a meaningful context.

According to some embodiments, each of the plurality of running flows may be associated with one of a plurality of users, and each of the plurality of users may be associated with one or more of the plurality of running flows.

Each of the running flows may be associated with a number of users, or customers, and the user of each running flow may be different. This may enable the performance of the running flow of one user to be compared to similar running flows of a variety of other users, each of which may have access to a different capacity of the system.

According to some embodiments, generating a performance report may further comprise: receiving a performance report query from a user of the plurality of users; generating the performance report based on the generated one or more performance summaries, wherein each of the one or more performance summaries are based on the performance data associated with one or more of the plurality of running flows, wherein at least one of the one or more of the plurality of running flows is associated with the user; and transmitting the performance report to the user responsive to receiving the performance report query.

The user may request the performance report, and this performance report may be produced to display the performance of the running flows associated with said user. Performance summaries which are not linked to running flows associated with the user may not be included due to being irrelevant to said user.

According to some embodiments, the system may be a multitenancy integration cloud system, and each of the plurality of running flows may be allocated a predetermined processing capacity of the system.

Each of the users running on the system may be allocated a certain amount of the processing capacity of the system to run their associated running flows. If the processing capacity allocated to a certain user is low, then the running flows associated with the certain user may perform worse than for another user running similar running flows with a higher allocation of processing capacity. This provides the difference in performance of the running flows in a cloud based multi-tenancy system.

According to some embodiments of the present disclosure, there is provided a computer-implemented method for updating a performance report for a system configured to run a plurality of flows. The method comprises obtaining a performance report, the performance report being based on one or more performance summaries associated with one or more of a plurality of templates. The method also includes obtaining a plurality of test flows, wherein each test flow is associated with one of the plurality of templates. The method further includes executing a set of the plurality of test flows on the system. The method further includes obtaining test performance data associated with each of set of the plurality of executed test flows. The method further comprises generating, for at least one of the plurality of templates, a test performance summary based on test performance data associated with each of the test flows associated with the template. The performance report is updated based on the generated one or more test performance summaries.

Another aspect of embodiments of the present disclosure is the generation of additional performance data to provide further context to the performance data of flows linked to a template. This is achieved by running test flows on the system, which are based on the template, and therefore are linked to flows running on the system linked to said template. In this way, test performance data can be produced, which for example may reflect the performance of a flow running with access to the ideal capacity levels, and therefore the best performance that flows may realistically achieve. This data may then be provided to users to further inform capacity planning processes (e.g., by providing information about the performance that one or more flows may achieve).

It is proposed to further utilize the templates linked to a plurality of flows in order to obtain a plurality of test flows. These test flows may then be run on the system in order to provide more performance data, in the form of test performance data, and therefore more context to the plurality of flows linked to the template which the test flow is based upon. This may, for, example, be used to update a performance report and therefore provide a user/customer more information in order to inform their capacity planning process.

According to some embodiments, obtaining test performance data may comprise: obtaining, for each of the set of the plurality of test flows, one or more selected from the group consisting of: a latency of the test flow; a data rate per second of the test flow; a cost of the test flow; and a time at which the test flow was executed on the system.

According to some embodiments, the execution of the set of the plurality of test flows may comprise: determining the set of the plurality of test flows based on the idle processing capacity of the system; and executing the set of the plurality of test flows on the system.

This results in the selection of tests flows which takes into account the spare processing capacity of the system, which means that, for example, the spare capacity of the system which is utilized by the test flows may be maximized without impacting the parts of the system used by other flows. Test flows to be executed may be prioritized by, for example, which template most recently had a test flow based upon it performed on the system, or the number of flows linked to a template which the test flow is based upon.

According to some embodiments, determining of the set of the plurality of test flows may further comprise: determining the idle processing capacity of the system; increasing the amount of the processing capacity of the system used by the test flows responsive to determining that the idle processing capacity system is above a predetermined capacity threshold; and decreasing the amount of the processing capacity of the system used by the test flows, responsive to determining that the idle processing capacity system is below a predetermined capacity threshold.

In this way the test flows may be ramped up or down depending on how much of the processing capacity of the system is being used by actual running flows on the system. A spare capacity overhead may be maintained to ensure adequate processing capacity for the running flows.

According to some embodiments, increasing the amount of the processing capacity of the system used by the test flows may comprise at least one selected from the group consisting of: adding one or more test flows to the set of the plurality of test flows; and increasing the data throughput of one or more of the test flows in the set of the plurality of test flows. According to some embodiments, decreasing the amount of the processing capacity of the system used by the test flows may comprise at least one of: removing one or more test flows from the set of the plurality of test flows; and decreasing the data throughput of one or more of the test flows in the set of the plurality of test flows.

By adding test flows, performance data may be obtained to compare to more running flows. By increasing the data throughput, the test flow performance data can be measured to compare to running flows with a large data throughput. Removing test flows and decreasing data throughput may be performed in order to ensure an adequate processing capacity overhead.

Embodiments of the present disclosure also provide a method for generating a performance report for a system configured to run a plurality of flows according to some embodiments, and further comprises updating the performance report according to other embodiments.

Embodiments of the present disclosure also provide a system comprising a processor and a computer-readable storage medium communicatively coupled to the processor and storing program instructions which, when executed by the processor, cause the processor to perform a method. The method performed by the processor comprises obtaining performance data associated with each of a plurality of running flows on a system. The method also includes obtaining a plurality of templates, where each template describes a function of a flow. The method also includes linking each of the plurality of running flows to one of the plurality of templates which describes a function of the linked running flow. The method further includes generating, for each of one or more templates, a performance summary based on the performance data associated with each of the plurality of running flows linked to the template. The method further includes generating a performance report based on the generated one or more performance summaries.

According to some embodiments, generating a performance summary may further comprise: determining, by the processor and for each of one or more templates, whether a number of running flows linked to the template satisfies a condition based on a predetermined quantity; and generating, for each of the one or more templates, the performance summary based on the performance data associated with each of the plurality of running flows linked to the template, responsive to determining the number of running flows linked to the template satisfies the condition.

According to some embodiments, obtaining performance data may comprise: obtaining, by the processor and for each of the plurality of running flows, one or more selected from the group consisting of: a latency of the running flow; a data rate per second of the running flow; a cost of the running flow; and a time at which the running flow was executed on the system.

According to some embodiments, the performance summary may comprise one or more selected from the group consisting of: an average of the performance data of the plurality of running flows linked to the template; a range of the performance data of the plurality of running flows linked to the template; and a list of one or more of the performance data of the plurality of running flows linked to the template.

According to some embodiments, generating a performance report may further comprise: receiving, by the processor, a performance report query from a user of the plurality of users; generating the performance report based on the generated one or more performance summaries, wherein each of the one or more performance summaries are based on the performance data associated with one or more of the plurality of running flows, wherein at least one of the one or more of the plurality of running flows is associated with the user; and transmitting the performance report to the user responsive to receiving the performance report query.

According to some embodiments, the system may be a multitenancy integration cloud system, and each of the plurality of running flows may be allocated a predetermined processing capacity of the system.

According to some embodiments of the present disclosure, there is provided a system comprising a processor and a computer-readable storage medium communicatively coupled to the processor and storing program instructions which, when executed by the processor, cause the processor to perform a method. The method performed by the processor comprises obtaining a performance report, the performance report being based on one or more performance summaries associated with one or more of a plurality of templates. The method also includes obtaining a plurality of test flows, wherein each test flow is associated with one of the plurality of templates. The method further includes executing a set of the plurality of test flows on the system. The method further includes obtaining test performance data associated with each of set of the plurality of executed test flows. The method further comprises generating, for at least one of the plurality of templates, a test performance summary based on test performance data associated with each of the test flows associated with the template. The performance report is updated based on the generated one or more test performance summaries.

According to some embodiments, obtaining test performance data may comprise: obtaining, by the processor and for each of the set of the plurality of test flows, one or more selected from the group consisting of: a latency of the test flow; a data rate per second of the test flow; a cost of the test flow; and a time at which the test flow was executed on the system.

According to some embodiments, the execution of the set of the plurality of test flows may comprise: determining, by the processor, the set of the plurality of test flows based on the idle processing capacity of the system; and executing the set of the plurality of test flows on the system.

According to some embodiments, determining of the set of the plurality of test flows may further comprise: determining, by the processor, the idle processing capacity of the system; increasing the amount of the processing capacity of the system used by the test flows responsive to determining that the idle processing capacity system is above a predetermined capacity threshold; and decreasing the amount of the processing capacity of the system used by the test flows, responsive to determining that the idle processing capacity system is below a predetermined capacity threshold.

According to some embodiments, increasing the amount of the processing capacity of the system used by the test flows may comprise at least one selected from the group consisting of: adding one or more test flows to the set of the plurality of test flows; and increasing the data throughput of one or more of the test flows in the set of the plurality of test flows. According to some embodiments, decreasing the amount of the processing capacity of the system used by the test flows may comprise at least one of: removing one or more test flows from the set of the plurality of test flows; and decreasing the data throughput of one or more of the test flows in the set of the plurality of test flows.

According to some embodiments of the present disclosure, there is provided a computer program product for generating a performance report for a system configured to run a plurality of flows. The computer program product comprising a computer-readable storage medium having program instructions embodied therewith, the program instructions executable by a processor to cause the processor to perform a method. The method comprises obtaining performance data associated with each of a plurality of running flows performed on the system. The method also includes obtaining a plurality of templates, where each template describes a function of a flow. The method also includes linking each of the plurality of running flows to one of the plurality of templates which describes a function of the linked running flow. The method further includes generating, for each of one or more templates, a performance summary based on the performance data associated with each of the plurality of running flows linked to the template. The method further includes generating a performance report based on the generated one or more performance summaries.

The above summary is not intended to describe each illustrated embodiment or every implementation of the present disclosure. These and other aspects of the present disclosure will be apparent from and elucidated with reference to the embodiment(s) described hereinafter.

BRIEF DESCRIPTION OF THE DRAWINGS

For a better understanding of the present disclosure, and to show more clearly how it may be carried into effect, reference will now be made, by way of example only, to the accompanying drawings, in which.

DETAILED DESCRIPTION

Figure 1:
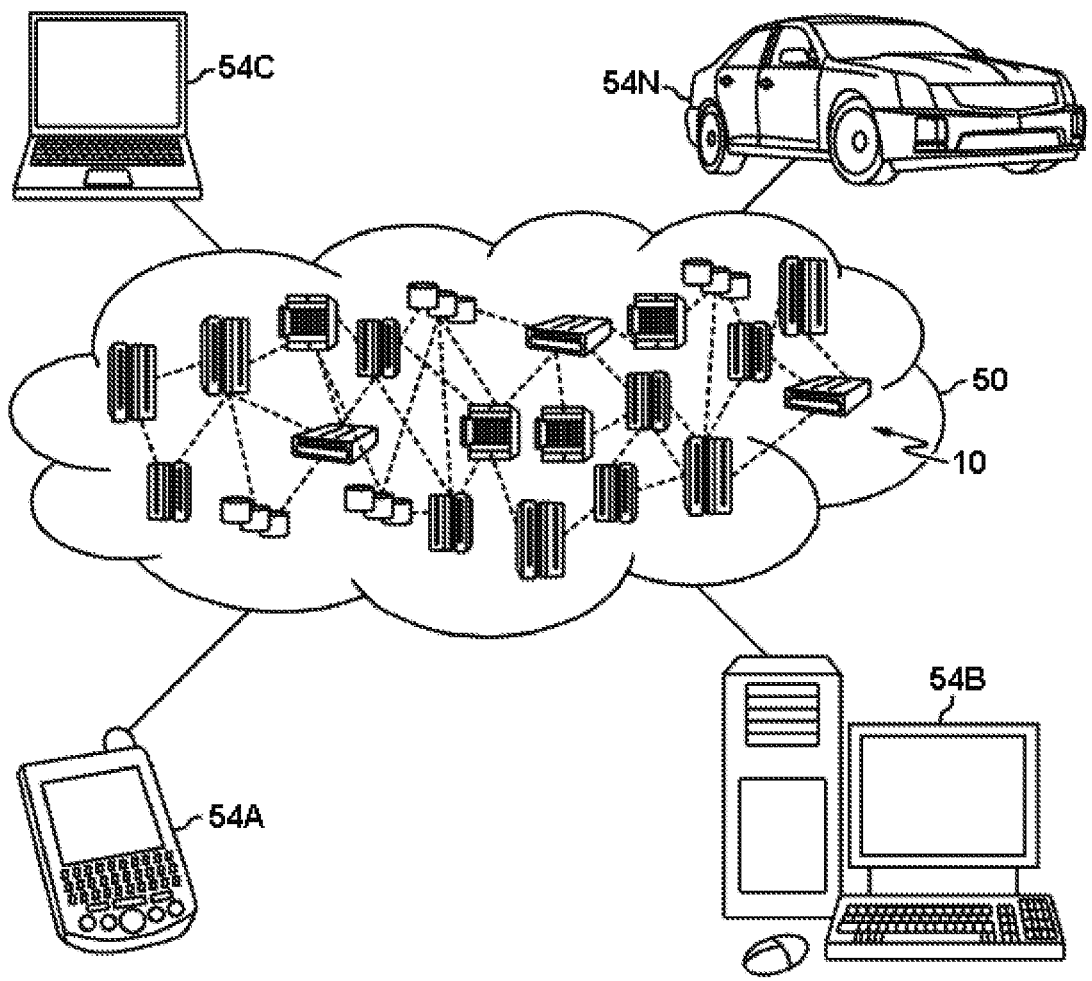
FIG. 1 depicts a cloud computing environment according to an embodiment of the present invention.

The present disclosure will be described with reference to the Figures.

It should be understood that the Figures are merely schematic and are not drawn to scale. It should also be understood that the same reference numerals are used throughout the Figures to indicate the same or similar parts.

In the context of the present application, where embodiments of the present disclosure constitute a method, it should be understood that such a method may be a process for execution by a computer, i.e. may be a computer-implementable method. The various steps of the method may therefore reflect various parts of a computer program, e.g., various parts of one or more algorithms.

Integration of applications and services typically involves: (i) configuring a flow (otherwise referred to as an 'application flow' or 'integration flow'), which describes the flow of data between applications and the processing performed on data inputs and outputs; and then (ii) parsing and transforming the data to a format that is consumable by another application or service. Such flows are typically stored in a format such as eXtensible Markup Language (xml), JavaScript Object Notation (j son), Ain't Markup Language (yaml) and can be interpreted by a particular runtime as a set of instructions (where each discrete set of instructions is called a node) for interacting with other systems. The flows are configured by connecting together a sequence of nodes, each of which is tailored to perform a particular task (e.g., transform, filter, aggregate, etc.). An integration product of an on-premise or off-premise platform then processes the data as specified by the flow. On-premise platforms are well-established and considered to provide a good level of security because data is stored and handled internally, e.g., within an internal private network. Off-premise platforms (such as cloud computing resources) are a relatively recent and evolving concept. Generally, reference to off-premise resources or platforms is taken to refer to a concept for enabling ubiquitous, convenient, and on-demand access via Internet to shared pools of configurable off-premise (e.g., remotely located) computing resources such as networks, applications, servers, storages, applications, functionalities, and the like which are accessible via the Internet. Conversely, reference to on-premise resources or platforms is taken to refer to a concept of local or private computing resources such as networks, servers, storage devices, application, etc. that are situated locally or within/behind a virtual boundary (often behind a firewall).

According to proposed embodiments, there is provide a method and/or apparatus for generating a performance report for a system configured to run a plurality of flow. Such a proposed method/apparatus obtains performance data associated with each of a plurality of running flows performed on the system. A plurality of templates (where each template describes a function of a flow) is also obtained. Each of the running flows is then linked to a template which describes a function of the linked running flow. A performance summary for each of one or more templates is then generated based on the performance data associated with each of the plurality of running flows linked to the template. In other words, for each template, a performance summary is generated based on the ascertained performance of the flows linked to the template. Such a summary may represent a performance associated with a particular function. A performance report can then be created based on the performance summaries.

The linking of flows running on a system to templates which describe a function of flow enables the grouping of flows which conform to a given template (i.e. relate to the function of the template). Performance data can be obtained for each flow running on the system which reflects the performance. Subsequently, it is possible to produce a performance summary in which performance data of flows which conform to a given template can be compared and contrasted, such that the performance data collected for an individual flow can be contextualized. This context could be useful for customers when assessing performance, and for informing changes to be made to the flow or the system on which the flow is run.

It is proposed that the information which customers are missing during a capacity planning process may relate to the performance of the customers' flows, and how this performance compares to a situation where the capacity is increased. By linking flows running on the system to templates, it is possible to get a number of sets of flows which are similar. It is then possible to gather performance data for all of said flows and compare the performance. In this way, performance can be compared to other flows which have a function in common, but for example may have access to different system processing capacities. By then producing a performance report, it could be easily seen by the customer how the performance of their flow compares to other, similar, flows, and this may inform said customer's capacity planning process.

In some embodiments, generating a performance summary further comprises: determining, for each of one or more templates, if a number of running flows linked to the template satisfies a condition based on a predetermined quantity; and generating, for each of the one or more templates, the performance summary based on the performance data associated with each of the plurality of running flows linked to the template, responsive to determining the number of running flows linked to the template satisfies the condition.

For example, this embodiment ensures that a performance summary is only produced if there are an adequate number of running flows linked to it to ensure meaningful comparisons and ensure anomalous data has a reduced impact. The result is a performance summary which presents performance data which reflects the performance of a large range of similar flows running in different conditions.

According to some embodiments, obtaining performance data comprises: obtaining, for each of the plurality of running flows, one or more of: a latency of the running flow; a data rate per second of the running flow; a cost of the running flow; and a time at which the running flow was executed on the system.

It is possible to further utilize the templates linked to a plurality of flows in order to obtain a plurality of test flows. These test flows can then be run on the system in order to provide more performance data, in the form of test performance data, and therefore more context to the plurality of flows linked to the template which the test flow is based upon. This can be used to update a performance report and therefore give a user/customer more information in order to inform their capacity planning process.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
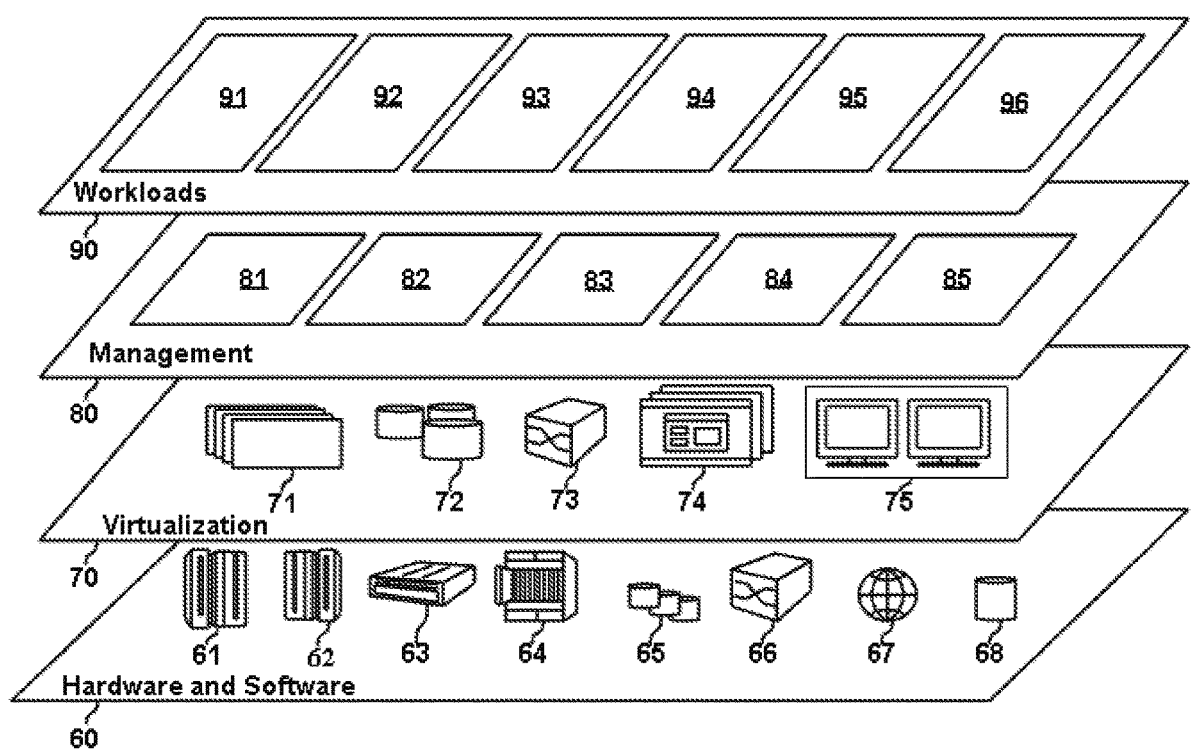
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Performance reporting 85 provides for generating performance reports according to proposed concepts as detailed herein.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Illustrative embodiments may be utilized in many different types of distributed processing environments. In order to provide a context for the description of elements and functionality of the illustrative embodiments, the figures are provided hereafter as an example environment in which aspects of the illustrative embodiments may be implemented. It should be appreciated that the figures are only exemplary and not intended to assert or imply any limitation with regard to the environments in which aspects or embodiments of the present invention may be implemented. Many modifications to the depicted environments may be made without departing from the spirit and scope of the present invention. Moreover, an apparatus or system embodying one or more of the proposed concepts may take the form of any of a number of different processing devices including client computing devices, server computing devices, a tablet computer, laptop computer, telephone or other communication devices, personal digital assistants (PDAs), or the like. In some illustrative examples, an off-premise device and an on-premise device may comprise a portable computing device that is configured with flash memory to provide non-volatile memory for storing operating system files and/or user-generated data, for example. Thus, the system may essentially be any known or later-developed processing system without architectural limitation.

A proposed concept may enhance a system by providing an apparatus or method that generates a performance report for a system running a plurality of flows. Such proposals can extend or improve the capacity planning and/or allocation capabilities.

To aid understanding of the proposed concept(s), exemplary embodiments will now be described with reference to FIGS. 3A and 3B.

Figure 3A:
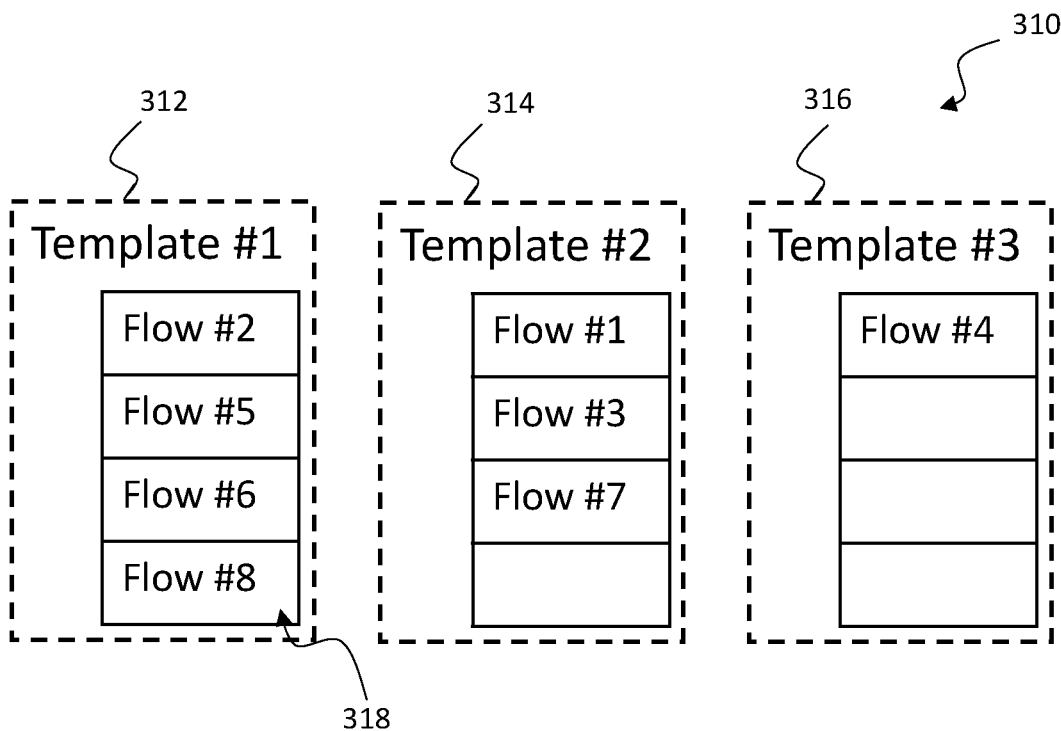
FIG. 3A shows a block diagram depicting three templates and an example set of flows associated with each template, in accordance with embodiments of the present disclosure.

FIG. 3A shows a block diagram 310 depicting three templates and an example set of flows 318 associated with each template, in accordance with embodiments of the present disclosure.

A flow may be thought of a set of actions which are connected together to achieve a task. For example, a flow could be an integration, in which the input to one system or application is connected to a call to another system. A running flow may be a flow that is running, or has run, on the system configured to run a plurality of flows.

A template describes the pattern of one flow, or may describe the pattern of more than one flow. Flows may be created from a template. In the case that a template describes the pattern of more than one flow, there may be an element of variability in the pattern that the template describes, such that the more than one flows can be created from the template. A set of templates may be generated from a set of flows, for example, such that 100 flows generate 100 templates, 100 flows generate 50 templates, or 100 flows generate 10 templates.

As shown in FIG. 3A, Template #1 312 may best describe the pattern or function of flow #2, flow #5, flow #6 and flow #8. Template #2 314 may best describe the pattern or function of flow #1, flow #3 and flow #7. Template #3 316 may best describe the pattern or function of flow #4. If a flow exists whose pattern or function cannot be described by any of the existing templates, then a new template may be generated from said flow. If a flow exists whose pattern or function cannot be described by any of the existing templates, then a new template may be generated from said flow and one or more other flows. If a flow exists whose pattern or function cannot be described by any of the existing templates, then a new template may be generated by generalizing an existing template.

Running flows may be linked to a template which describes the function or a pattern of the running flow. Running flows may be linked to a template which best describes the function or pattern of the running flow. The template which best describes the function or pattern of the running flow may be determined by a measure of variability in the pattern of flow described by the template, and the actual pattern of the running flow.

Figure 3B:
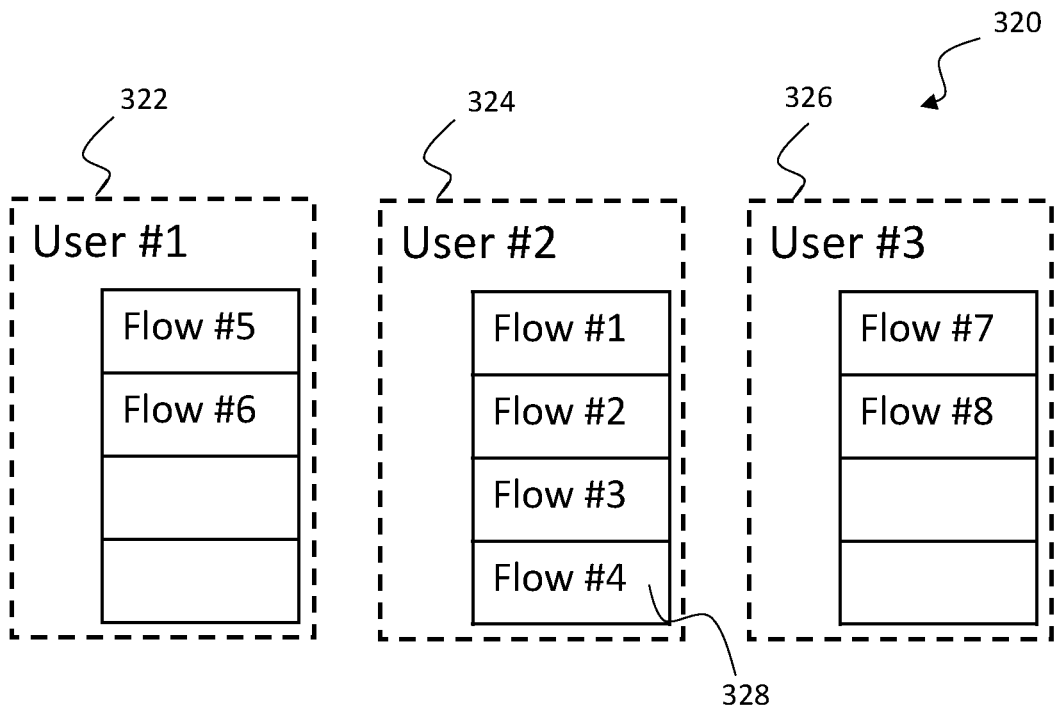
FIG. 3B shows a block diagram depicting three users and an example set of flows associated with each user, in accordance with embodiments of the present disclosure.

FIG. 3B show a block diagram 320 depicting three users and an example set of flows 328 associated with each user, in accordance with embodiments of the present disclosure.

The system may run a plurality of running flows. Each of the plurality of running flows may be from associated with a user. Each user may have a plurality of running flows. As shown in FIG. 3B, user #1 322 is associated with running flow #5 and flow #6. User #2 324 is associated with running flow #1, flow #2, flow #3, and flow #4. User #3 326 is associated with running flow #7 and flow #8. A running flow associated with a user may have a degree of similarity with a running flow associated with another user, such that the flows are linked to the same template.

Figure 4:
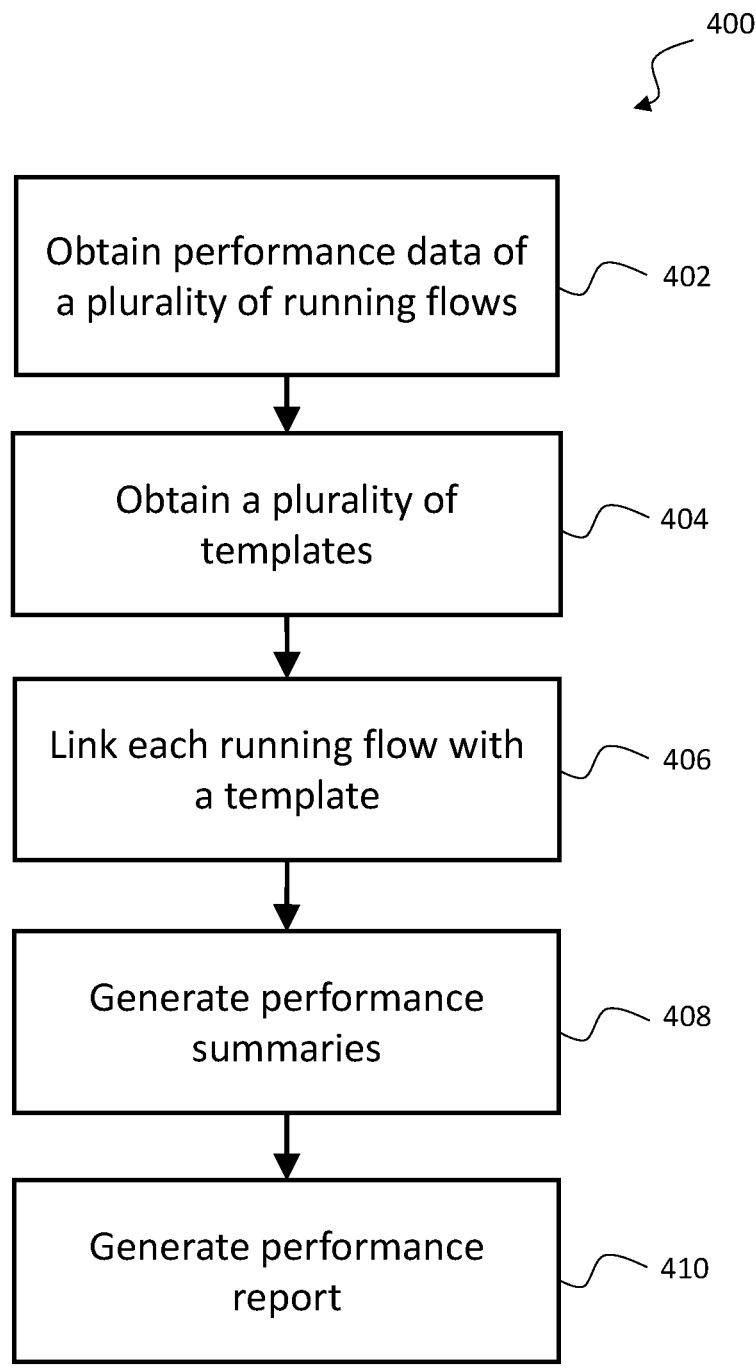
FIG. 4 shows a flow diagram of a method for generating a performance report, in accordance with embodiments of the present disclosure.

FIG. 4 shows a flow diagram 400 depicting a method of generating a performance report, in accordance with embodiments of the present disclosure.

In step 402, performance data from a plurality of running flows is obtained. This may include, but is not limited to, measuring the latency of the running flow, measuring the data rate through the running flow, measuring the system cost in terms of memory of the running flow and measuring the system cost in terms of processing of the running flow. The time at which the running flow is running on the system may also be recorded.

In step 404, a plurality of templates are obtained. These templates may be obtained from a template database. Alternatively, the templates may be generated from the plurality of running flows. The templates may describe the function of a flow, and they may describe the function of one or more of the plurality of running flows.

In step 406, each of the plurality of running flows are linked to a template which describes a function of the running flow. The template which the running flow is linked to may describe the running flow. A best fit may be determined by minimizing the variability in the pattern of a flow described by the template with the pattern of the running flow. Alternatively, the running flow may be linked to the template which describes the function of the fewest number of flows, while still describing (or most closely describing) the function of the running flow.

The running flow may be linked to only one of the plurality of templates. This provides the benefit of only being linked to the template which best describes the function of the running flow. Alternatively, the running flow may be linked to more than one of the plurality of templates. This provides the benefit of being compared to a wider range of different flows, such that there are more performance data points for comparison.

In step 408, a performance summary is generated for each template in the plurality of templates. A performance summary may not be generated for a template if the number of running flows linked to a template is below a certain number. For example, if only one running flow is linked to a template, then a performance summary may not be generated. This ensures that each generated performance summary has a sufficient number of performance data of running flows such that anomalous data is compensated for.

Generating a performance summary for a given template may include, but is not limited to, calculating an average of the performance data of all of the running flows linked to the template, calculating a range of the performance data of all of the running flows linked to the template, collating a list of performance data of all of the running flows linked to the template, and/or calculating a maximum and a minimum of the performance data of all of the running flows linked to the template.

A performance summary may also be generated using performance data from running flows at a given time, such that the performance summary is specific, for example, to performance data from flows which were run on the system in the morning, in the afternoon, during a specific hour of the day or a specific day of the week a day of the week. Performance data from flows running at different times of the day may also be compared and contrasted in the performance summary, in order to aid the user in identifying bottlenecks, or times of excess capacity. This would aid in the capacity planning process, and also the planning process on when to run certain flows on the system.

In step 410, a performance report is generated. This may be based on one or more of the performance summaries generated in step 408.

In some embodiments, a performance report query is received from a user. The user may be associated with a plurality of running flows on the system, which are linked to a plurality of templates. Upon receiving the performance report query, a performance report is generated. In this case, the performance report may be generated based on one of more performance summaries, where each of the performance summaries is associated with a template which is linked to one or more running flows associated with said user. This means that only performance summaries relevant to the user are presented to the user in the performance report. Upon generation of the performance report, the performance report is transmitted to the user.

In one example, the user may choose which performance data to include in the performance report and the way the performance data is processed to generate each of the performance summaries which the performance report is based on. In another example, the performance data and the way the performance data is used to generate each of the performance summaries which the performance report is based on is determined automatically.

For example, a user may be associated with two running flows. Each of the running flows may be linked to a respective template. Performance data for each running flow is obtained and then compiled into a performance summary, including performance data of other running flows linked to the template. The performance summaries are then used to generate a performance report. The performance report is then transmitted to the user. The performance report may include the performance data of the two running flows associated with the user, the average of the performance data of other flows which are similar to the said two running flows, and the best performance data of other flows which are similar to the said two running flows. In addition, the performance data of each running flow at different times may be presented in the performance report.

In other words, the generation of a performance report may be stated as follows. Each user's running flow is matched to a template which best describes the function of the running flow. Effectively, all running flows are categorized into groups of flows that conform to a given template. The performance data collected from the running flows would then be stored against their corresponding template in the form of a performance summary. This may only be done if a certain number of different running flows are linked to the same template in order to anonymize the performance data. The performance summaries may then be collected and added to an automatically generated performance report that shows the average performance metrics for each template.

Figure 5:
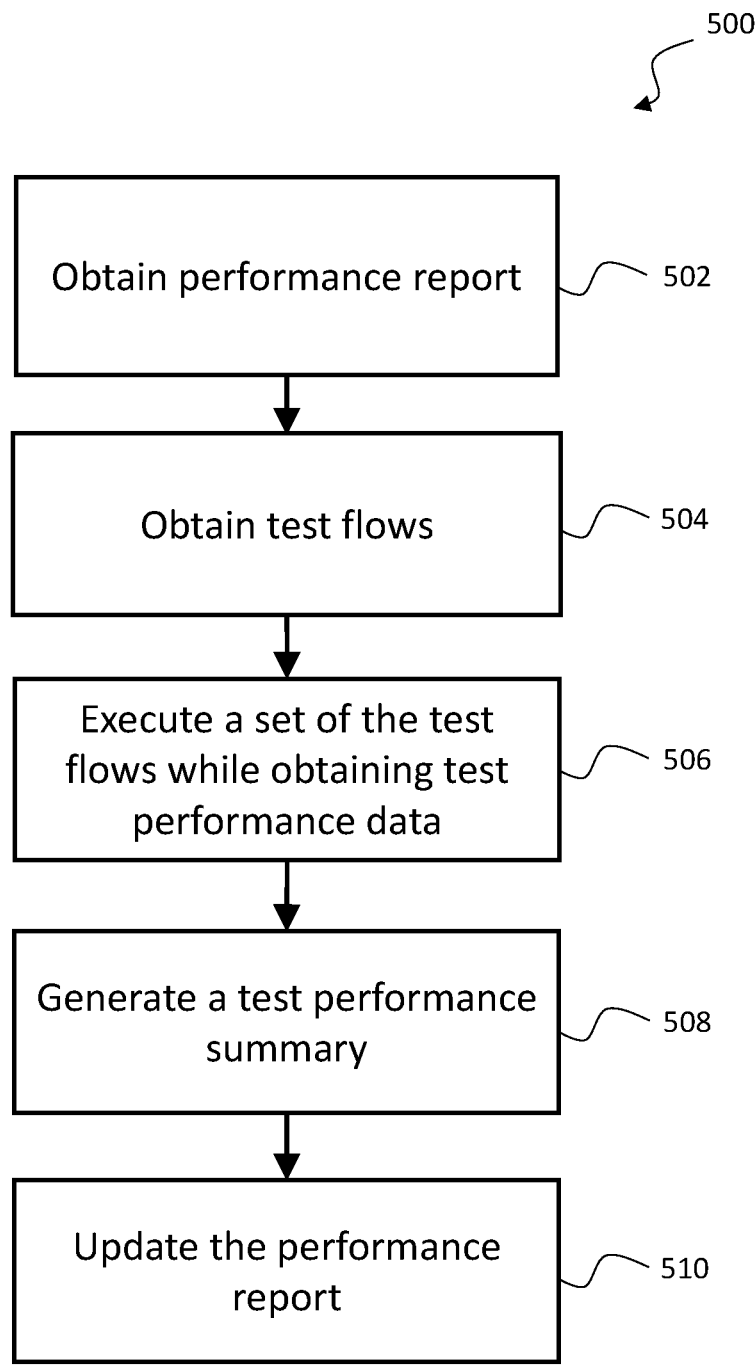
FIG. 5 shows a flow diagram of a method for updating a performance report, in accordance with embodiments of the present disclosure.

FIG. 5 shows a flow diagram 500 depicting a method of updating a performance report, in accordance with embodiments of the present disclosure.

In step 502, a performance report is obtained which relates to the performance of a plurality of running flows. The performance report may be based on one or more performance summaries, each of which may be related to a template. Each of the said templates may be linked to a plurality of running flows.

In step 504, a plurality of test flows are obtained, each of which is associated with a template. There may be at least one test flow for each template associated with each performance summary in the performance report. Each test flow may be generated from said template. Alternatively, each test flow may be obtained from a database of test flows. Each test flow may share a function in common with one or more of the plurality of running flows.

In step 506, a set of the plurality of test flows are executed, and the test performance data of each test flow is obtained.

A set of the plurality of test flows is determined based on the spare capacity of the system. This capacity may, for example, be a processing capacity or a storage capacity. The amount of capacity that the test flows use is determined by the spare capacity of the system.

If the spare capacity of the system exceeds a certain amount, or percentage, threshold, the number of test flows on the system may be increased. Alternatively, if the spare capacity of the system exceeds a certain amount, or percentage, threshold, the data throughput, or driving rate, of the test flows already running on the system may be increased.

If the spare capacity of the system is below a certain amount, or percentage, threshold, the number of test flows on the system may be reduced. Alternatively, if the spare capacity of the system is below a certain amount, or percentage, threshold, the data throughput, or driving rate, of the test flows already running on the system may be reduced.

In this way, the available capacity of the system for running flows is kept at an acceptable level to account for variations in running flow load. The available capacity of the system may be continually monitored and the set of test flows reevaluated on a continual basis to ensure an acceptable available capacity of the system.

The plurality of test flows in the set of test flows which are selected to be run on the system may be selected, for example, based on the last time the test flow was run, the last time a test flow was run which is associated with a given template, and/or the number of running flows which the test flow has a similar pattern or function to. In this way, a variety of test flows can be run such that test performance data relating to a large number of running flows is obtained.

While each of the test flows is run on the system, test performance data of each test flow is obtained. This may include, but is not limited to, measuring the latency of the test flow, measuring the data rate through the test flow, measuring the system cost in terms of memory of the test flow and measuring the system cost in terms of processing of the test flow. The time at which the test flow is running on the system may also be recorded.

In step 508, a test performance summary is generated. The test performance summary is generated based on test performance data obtained in the previous step. Each test performance summary relates to one of a plurality of templates associated with the performance report.

Generating a test performance summary for a given template may include, but is not limited to, calculating an average of the test performance data of all of the test flows linked to the template, calculating a range of the test performance data of all of the test flows linked to the template, collating a list of test performance data of all of the test flows linked to the template, and/or calculating a maximum and a minimum of the test performance data of all of the test flows linked to the template.

A test performance summary may also be generated using test performance data from test flows at a given time, such that the test performance summary is specific, for example, to test performance data from flows which were run on the system in the morning, in the afternoon, during a specific hour of the day or a specific day of the week a day of the week. Test performance data from the test flows running at different times of the day may also be compared and contrasted in the test performance summary, in order to aid the user in identifying bottlenecks, or times of excess capacity. This would aid in the capacity planning process, and also the planning process on when to run flow batches on the system, or when to run a flow such that it performs beyond a certain level.

In step 510, the performance report is updated. Test performance summaries are added to the performance report. Test performance summaries associated with templates which are associated with performance summaries in the performance report are added. In this way, test performance data is added which is of relevance to the running flows which are included in the performance report. This may give the user an indication as to the cost, latency, and maximum throughput possible for their running flows, as they are able to compare the performance of their running flows, to the performance of other running flows on the system from the original performance report, and to the performance of test flows.

In other words, the updating of the performance report may be stated as follows. For each template that has been identified a test flows can be manually created in the same manner that flows are normally created from templates. In practice, the tests run on the system may be based on a subset of the templates. This subset can be determined based on how many running flows are associated with each template, and also how different the template is from other templates. This subset of test flows may then be run on a continuous cycle on the system where the driving rate is increased until a percentage of the whole systems processing capacity is reached. The test flows would "ramp back" once the threshold had been exceeded to keep the available processing for running flows at an acceptable level. The test performance data from the test flows can then combined with the running flow performance data numbers in the performance report. This would allow the report to show rates achieved by real users running flows for a given template and to show the maximum possible rates achieved by test flows. From this the users may be able to get an idea of the cost, latency and maximum throughput possible. It may be expected there would be far few data points of the test performance data from test flows than the performance data from running flows.

The performance reports may be updated regularly in the above described fashion. For example, the performance report may be updated whenever the performance report is generated, whenever the user sends a performance report query, or whenever a performance summary is generated.

Figure 6:
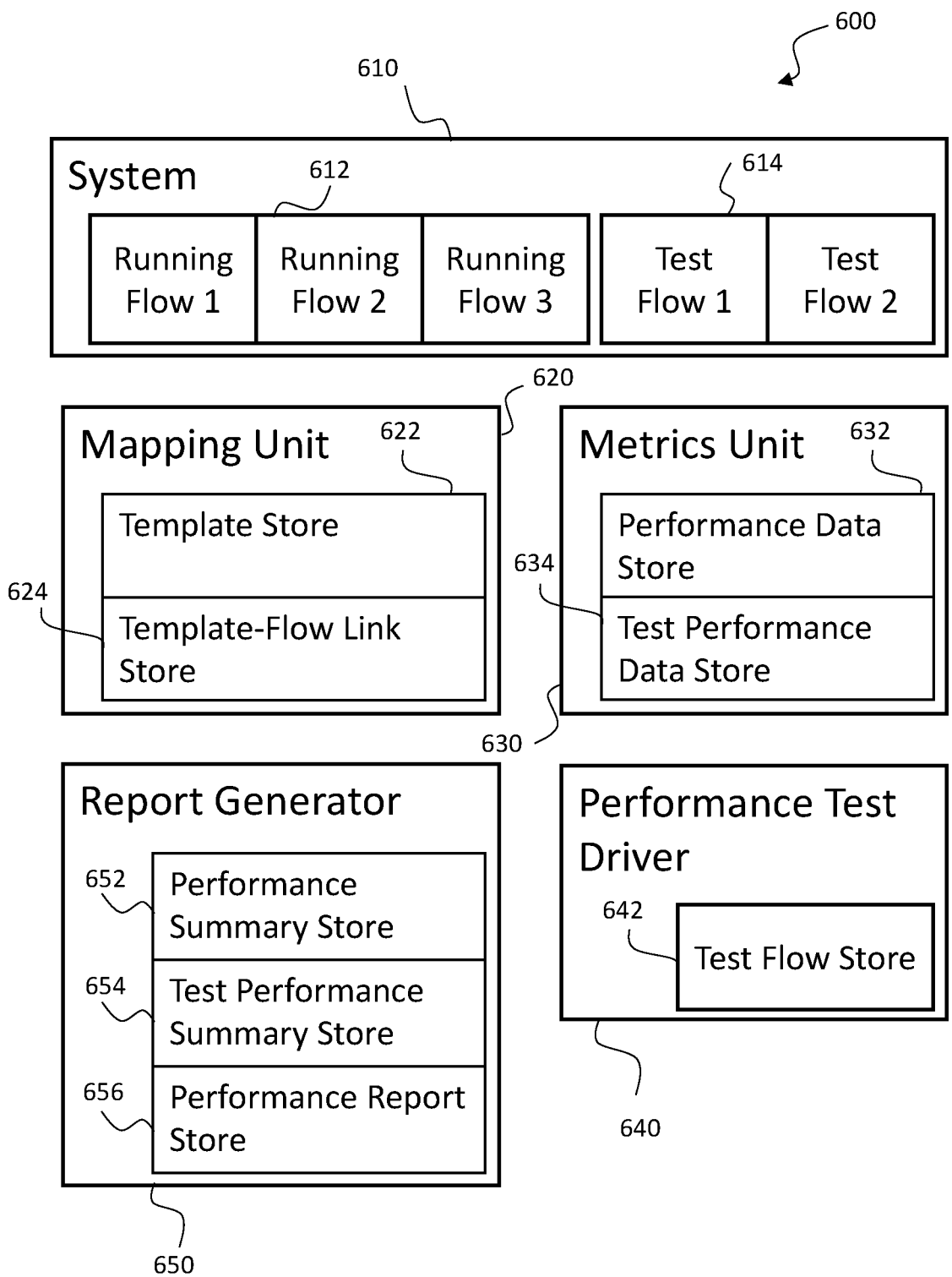
FIG. 6 shows a block diagram of an apparatus configured to generate and update a performance report, in accordance with embodiments of the present disclosure.

FIG. 6 shows a block diagram 600 depicting an apparatus for generating and updating a performance report, in accordance with embodiments of the present disclosure.

The system 610 is configured to run a plurality of flows, including a plurality of running flows 612 and a plurality of test flows 614. The system 610 may be a cloud-based multi-tenancy system, configured to run a plurality of flows from a plurality of users, wherein each user has access to a certain processing capacity of the system. The system 610 may be a cloud-based integration product, such as a cloud-based application (examples of which are known and widely available).

The mapping unit 620 may be configured to store templates in a template store 622. The mapping unit 620 may be configured to store the links between the running flows and test flows and the templates in a template-flow link store 624. The mapping unit 620 is configured to obtain a plurality of templates and link each of the running flows to one or more of said templates. The mapping unit 620 may be configured to determine the template which best describes the function and or pattern of a running flow.

The metrics unit 630 is configured to obtain performance data associated with each of the plurality of running flows 612 on the system 610. The metrics unit 630 may be further configured to store the performance data associated with each of the plurality of running flows on the system 612 in a performance data store 632.

The metrics unit 630 is also configured to obtain test performance data associated with each of the plurality of test flows 614 on the system 610. The metrics unit 630 may be further configured to store the test performance data associated with each of the plurality of test flows 614 on the system 610 in a test performance data store 634.

The metrics unit 630 may be configured to obtain a latency, data rate, cost and a time of running, of flows running on the system 610.

The performance test driver 640 is configured to obtain a plurality of test flows, determine the set of test flows which should be run on the system based on the spare processing capacity of the system 610, and drive the set of the plurality of test flows 614 on the system 610. The performance test driver 640 may be configured to store the test flows in a test flow store 642. The performance test driver 640 may be further configured to determine the idle capacity of the system 610, and increase or decrease the capacity of the system 610 used by the test flows 614. The performance driver 640 may be further configured to add or remove test flows from the set of test flows 614 on the system 610, and to increase or decrease the data throughput of the set of plurality of test flows 614 on the system 610.

The report generator 650 is configured to generate performance summaries, and store performance summaries in a performance summary store 652. For each template, the report generator 650 may be configured to obtain which running flows are associated with a template from the mapping unit 620, and then compile the performance data from the metrics unit 630 associated with the running flows into a performance summary. Compiling the performance data may include averaging the performance data, determining a range of performance data and/or determining a maximum and a minimum of performance data. The performance report generator 650 may not generate a performance summary for a template if the template has lower than a certain number of running flows linked to it.

The report generator 650 is further configured to generate test performance summaries, and store test performance summaries in a test performance summary store 654. The report generator 650 may be configured to obtain which test flows are associated with a template from the mapping unit 620, and then compile the test performance data from the metrics unit 632 associated with the test flows into a test performance summary. Compiling the test performance data may include averaging the test performance data, determining a range of test performance data and/or determining a maximum and a minimum of test performance data.

The report generator 650 is further configured to generate and update performance reports. The report generator 650 is configured to store the performance report in a performance report store 656.

The report generator 650 may generate a performance report based on a number of performance summaries. The report generator 650 may be configured to receive a performance report query from a user, generate a performance report based on performance summaries that are linked to the user via a running flow linked to a template which the performance summary is associated with, and transmit the performance report to the user. Alternatively, the performance report generator 650 may be further configured to update the performance report with test performance summaries before transmitting the performance report to the user. The report generator 650 may be configured to store the performance report, and update the performance report continually. Alternatively, the report generator 650 may be configured store the performance report, and update the performance report upon receiving a performance report query from a user.

Figure 7:
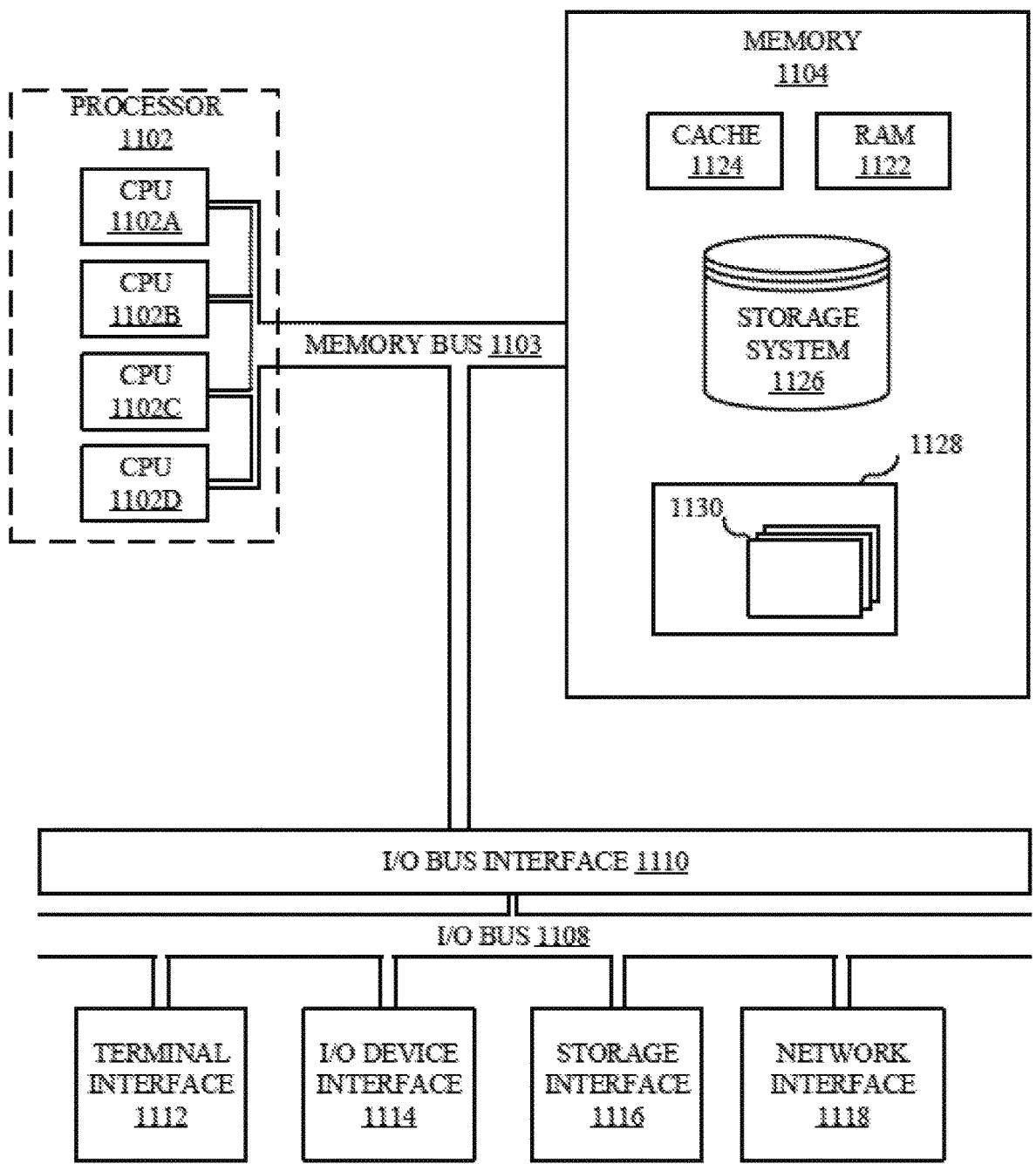
FIG. 7 illustrates a high-level block diagram of an example computer system that may be used in implementing one or more of the methods, tools, and modules, and any related functions, described herein, in accordance with embodiments of the present disclosure.

Referring now to FIG. 7, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 400 and 500).

System memory subsystem 1104 may include computer system readable media in the form of volatile memory, such as random-access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 1104 can include flash memory, e.g., a flash memory stick drive or a flash drive. Memory devices can be connected to memory bus 1103 by one or more data media interfaces. The memory subsystem 1104 may include at least one program product having a set (e.g., at least one) of program modules that are configured to carry out the functions of various embodiments.

Although the memory bus 1103 is shown in FIG. 7 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interfaces 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 1101. In some embodiments, however, individual components may have greater or lesser complexity than as represented in FIG. 7, components other than or in addition to those shown in FIG. 7 may be present, and the number, type, and configuration of such components may vary.

One or more programs/utilities 1128, each having at least one set of program modules 1130 may be stored in memory subsystem 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 1128 and/or program modules 1130 generally perform the functions or methodologies of various embodiments.

From the above description, it will be appreciated proposed embodiments may provide one or more concepts for generating performance reports using the actual production system that end users will run their integrations on. Exemplary embodiments may be described as having two main parts:

(i) Collection of performance results from actual customers running flows and assignment of the results to a particular integration type (i.e. flow function) in the performance report; and (ii) Repeated cycling through running performance tests for each integration type using spare capacity in the production system with an automatic ramp down once capacity hits a certain level.

Results from the tests may be combined with user/customer numbers, so to enable a report to show rates achieved by real customer for a given function and/or to show the maximum possible based on a manually created test. From such information, user may obtain an idea of cost, latency and maximum throughput possible for example. This may enable the user to assess planned usage and undertake adjustments, changes or flow-matching according to requirements. Furthermore, results may also be recorded based on message size and time of day, so as to provide additional information to a customer on how performance of certain types of flow change throughout a time period (e.g., a 24-hr period) and thus enabling improved planning.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

An embodiment of the present disclosure provides a computer-implemented method for generating a performance report for a system adapted to run a plurality of flows, comprising: obtaining performance data associated with each of a plurality of running flows performed on the system; obtaining a plurality of templates, wherein each template describes a function of a flow; linking each of the plurality of running flows to one of the plurality of templates which describes a function of the linked running flow; generating, for each of one or more templates, a performance summary based on the performance data associated with each of the plurality of running flows linked to the template; and generating a performance report based on the generated one or more performance summaries.

The method may further include wherein generating a performance summary further comprises: determining, for each of one or more templates, if a number of running flows linked to the template satisfies a condition based on a predetermined quantity; and generating, for each of the one or more templates, the performance summary based on the performance data associated with each of the plurality of running flows linked to the template, responsive to determining the number of running flows linked to the template satisfies the condition.

The method may further include wherein obtaining performance data comprises: obtaining, for each of the plurality of running flows, one or more of: a latency of the running flow; a data rate per second of the running flow; a cost of the running flow; and a time at which the running flow was executed on the system.

The method may further include wherein the performance summary comprises one or more of: an average of the performance data of the plurality of running flows linked to the template; a range of the performance data of the plurality of running flows linked to the template; and a list of one or more of the performance data of the plurality of running flows linked to the template.

The method may further include wherein linking each of the plurality of running flows comprises: determining, for each of the plurality of running flows, the template in the plurality of templates that most closely describes the function of the running flow; and linking each of the plurality of running flows to one of the plurality of templates based on the determination.

The method may further include wherein each of the plurality of running flows are associated with one of a plurality of users, and wherein each of the plurality of users is associated with one or more of the plurality of running flows. In some embodiments, this method may further include wherein generating a performance report further comprises: receiving a performance report query from a user of the plurality of users; generating the performance report based on the generated one or more performance summaries, wherein each of the one or more performance summaries are based on the performance data associated with one or more of the plurality of running flows, wherein at least one of the one or more of the plurality of running flows is associated with the user; and transmitting the performance report to the user responsive to receiving the performance report query.

The method may further include wherein the system is a multitenancy integration cloud system, and wherein each of the plurality of running flows are allocated a predetermined processing capacity of the system.

Another embodiment of the present disclosure provides a computer-implemented method for updating a performance report for a system adapted to run a plurality of flows, comprising: obtaining the performance report, wherein the performance report is based on one or more performance summaries associated with one or more of a plurality of templates; obtaining a plurality of test flows, wherein each test flow is associated with one of the plurality of templates; executing a set of the plurality of test flows on the system; obtaining test performance data associated with each of the test flows in the set of the plurality of test flows; generating, for at least one of the plurality of templates, a test performance summary based on test performance data associated with each of the test flows associated with the template; and updating the performance report based on the generated one or more test performance summaries.

The method may further include wherein obtaining test performance data comprises: obtaining, for each of the set of the plurality of test flows, one or more of: a latency of the test flow; a data rate per second of the test flow; a cost of the test flow; and a time at which the test flow was executed on the system.

The method may further include, wherein the execution of the set of the plurality of test flows comprises: determining the set of the plurality of test flows based on the idle processing capacity of the system; and executing the set of the plurality of test flows on the system.

The method may further include wherein determining of the set of the plurality of test flows further comprises: determining the idle capacity of the processing of the system; increasing the amount of the processing capacity of the system used by the test flows, responsive to determining that the idle processing capacity system is above a predetermined capacity threshold; and decreasing the amount of the processing capacity of the system used by the test flows, responsive to determining that the idle processing capacity system is above a predetermined capacity threshold.

The method may further include wherein increasing the amount of the processing capacity of the system used by the test flows comprises at least one of: adding one or more test flows to the set of the plurality of test flows; and increasing the data throughput of one or more of the test flows in the set of the plurality of test flows, and wherein decreasing the amount of the processing capacity of the system used by the test flows comprises at least one of: removing one or more test flows from the set of the plurality of test flows; and decreasing the data throughput of one or more of the test flows in the set of the plurality of test flows.

The method may further include generating a performance report for a system adapted to run a plurality of flows, further comprising: updating the performance report wherein the execution of the set of the plurality of test flows comprises: determining the set of the plurality of test flows based on the idle processing capacity of the system; and executing the set of the plurality of test flows on the system.

Another embodiment of the present disclosure provides an apparatus for generating a performance report for a system adapted to run a plurality of flows, comprising: a metrics unit configured to obtain performance data associated with each of a plurality of running flows; a mapping unit configured to: obtain a plurality of templates, wherein each template describes a function of a flow; and link each of the plurality of running flows to one of the plurality of templates which describes a function of the linked running flow; and a report generator configured to: generate, for each of one or more templates, a performance summary based on the performance data associated with each of the plurality of running flows linked to the template; and generate a performance report based on the generated one or more performance summaries.

The apparatus may further include wherein the report generator is further configured to:
determine, for each of one or more templates, if a number of running flows linked to the template satisfies a condition based on a predetermined quantity; and generate, for each of the one or more templates, the performance summary based on the performance data associated with each of the plurality of running flows linked to the template, responsive to determining the number of running flows linked to the template satisfies the condition.

The apparatus may further include wherein the metrics unit is configured to obtain, for each of the plurality of running flows, one or more of: a latency of the running flow; a data rate per second of the running flow; a cost of the running flow; and a time at which the running flow was executed on the system.

The apparatus may further include wherein the report generator is further configured to:
receive a performance report query from a user; generate the performance report based on the generated one or more performance summaries, wherein each of the one or more performance summaries are based on the performance data associated with one or more of the plurality of running flows, wherein ones of the one or more of the plurality of running flows is associated with the user; and transmit the performance report to the user responsive to receiving the performance report query.

The apparatus may further include wherein the system is a multitenancy integration cloud system, and wherein each of the plurality of running flows are allocated a predetermined processing capacity limit of the system.

Another embodiment of the present disclosure provides an apparatus for updating a performance report for a system adapted to run a plurality of flows, comprising: a report generator configured to: obtain the performance report, wherein the performance report is based on one or more performance summaries associated with one or more of a plurality of templates; a performance test driver configured to: obtain a plurality of test flows, wherein each test flow is associated with one of the plurality of templates; drive the execution of a set of the plurality of test flows on the system; and a metrics unit configured to: obtain test performance data associated with each of set of the plurality of executed test flows; and wherein the report generator is further configured to: generate, for at least one of the plurality of templates, a test performance summary based on test performance data associated with each of the test flows associated with the template; and update the performance report based on the generated one or more test performance summaries.

The apparatus may further include wherein the metrics unit is configured to obtain, for each of the plurality test flows, one or more of: a latency of the test flow; a data rate per second of the test flow; a cost of the test flow; and a time at which the test flow was executed on the system.

The apparatus may further include wherein the performance test driver is configured to: determine the set of the plurality of test flows based on the idle processing capacity of the system; and drive the execution the set of the plurality of test flows on the system.

The apparatus may further include wherein the performance test driver is further configured to: determine the idle capacity of the processing of the system; increase the amount of the processing capacity of the system used by the test flows, responsive to determining that the idle processing capacity system is above a predetermined capacity threshold; and decrease the amount of the processing capacity of the system used by the test flows, responsive to determining that the idle processing capacity system is above a predetermined capacity threshold.

The apparatus may further include wherein the performance test driver is further configured to: add one or more test flows to the set of the plurality of test flows; increase the data throughput of one or more of the test flows in the set of the plurality of test flows; remove one or more test flows from the set of the plurality of test flows; and decrease the data throughput of one or more of the test flows in the set of the plurality of test flows.

Embodiments of the present disclosure also provide an apparatus for generating a performance report for a system configured to run a plurality of flows. The apparatus comprises a metrics unit configured to obtain performance data associated with each of a plurality of running flows. The apparatus also comprises a mapping unit configured to: obtain a plurality of templates, wherein each template describes a function of a flow; and link each of the plurality of running flows to one of the plurality of templates which describes a function of the linked running flow; and a report generator configured to: generate, for each of one or more templates, a performance summary based on the performance data associated with each of the plurality of running flows linked to the template; and generate a performance report based on the generated one or more performance summaries.

According to some embodiments, the report generator may be further configured to: determine, for each of one or more templates, if a number of running flows linked to the template satisfies a condition based on a predetermined quantity; and generate, for each of the one or more templates, the performance summary based on the performance data associated with each of the plurality of running flows linked to the template, responsive to determining the number of running flows linked to the template satisfies the condition.

According to some embodiments, the metrics unit may be configured to: obtain, for each of the plurality of running flows, one or more of: a latency of the running flow; a data rate per second of the running flow; a cost of the running flow; and a time at which the running flow was executed on the system.

According to some embodiments, the report generator may be further configured to: receive a performance report query from a user; generate the performance report based on the generated one or more performance summaries, wherein each of the one or more performance summaries are based on the performance data associated with one or more of the plurality of running flows, wherein ones of the one or more of the plurality of running flows is associated with the user; and transmit the performance report to the user responsive to receiving the performance report query.

According to some embodiments, the system may be a multitenancy integration cloud system, and wherein each of the plurality of running flows are allocated a predetermined processing capacity limit of the system.

According to some embodiments of the present disclosure, there is provided an apparatus for updating a performance report for a system configured to run a plurality of flows. The apparatus comprises a report generator configured to obtain the performance report, the performance report being based on one or more performance summaries associated with one or more of a plurality of template. The apparatus also comprises a performance test driver configured to: obtain a plurality of test flows, wherein each test flow is associated with one of the plurality of templates; and drive the execution of a set of the plurality of test flows on the system, and a metrics unit configured to; obtain test performance data associated with each of set of the plurality of executed test flows. The report generator is further configured to generate, for at least one of the plurality of templates, a test performance summary based on test performance data associated with each of the test flows associated with the template; and update the performance report based on the generated one or more test performance summaries.

According to some embodiments, the metrics unit may be configured to: obtain, for each of the plurality test flows, one or more of: a latency of the test flow; a data rate per second of the test flow; a cost of the test flow; and a time at which the test flow was executed on the system.

According to some embodiments, the performance test driver may be configured to: determine the set of the plurality of test flows based on the idle processing capacity of the system; and drive the execution the set of the plurality of test flows on the system.

According to some embodiments, the performance test driver may be further configured to: determine the idle capacity of the processing of the system; increase the amount of the processing capacity of the system used by the test flows, responsive to determining that the idle processing capacity system is above a predetermined capacity threshold; and decrease the amount of the processing capacity of the system used by the test flows, responsive to determining that the idle processing capacity system is below a predetermined capacity threshold.

According to some embodiments, the performance test driver may be further configured to: add one or more test flows to the set of the plurality of test flows; and increase the data throughput of one or more of the test flows in the set of the plurality of test flows; and remove one or more test flows from the set of the plurality of test flows; and decrease the data throughput of one or more of the test flows in the set of the plurality of test flows.

What is claimed is:

1. A computer-implemented method for generating a performance report for a system configured to run a plurality of flows, comprising:
obtaining performance data associated with each of a plurality of running flows on a system, wherein each of the plurality of running flows comprises a connected sequence of nodes, wherein each node of the connected sequence of nodes is configured to perform a task, and wherein each of the plurality of running flows is associated with one of a plurality of users;

obtaining a plurality of templates, wherein each template of the plurality of templates describes a function of a flow;

linking each of the plurality of running flows to one of the plurality of templates which describes a function of the linked running flow;

generating, for each of one or more templates which describes the function of the linked running flow, a performance summary based on the performance data associated with each of the plurality of running flows linked to the template; and generating a performance report based on the generated one or more performance summaries.

2. The computer-implemented method of claim 1, wherein generating the performance summary further comprises:

determining, for each of the one or more templates, whether a number of running flows linked to the template satisfies a condition based on a predetermined quantity; and generating, for each of the one or more templates, the performance summary based on the performance data associated with each of the plurality of running flows linked to the template, responsive to determining the number of running flows linked to the template satisfies the condition.

3. The computer-implemented method of claim 1, wherein obtaining performance data comprises:

obtaining, for each of the plurality of running flows, one or more selected from the group consisting of:
a latency of the running flow;
a data rate per second of the running flow;
a cost of the running flow; and
a time at which the running flow was executed on the system.

4. The computer-implemented method of claim 1, wherein the performance summary comprises one or more selected from the group consisting of:

an average of the performance data of the plurality of running flows linked to the template;
a range of the performance data of the plurality of running flows linked to the template;
and a list of one or more of the performance data of the plurality of running flows linked to the template.

5. The computer-implemented method of claim 1, wherein linking each of the plurality of running flows comprises:

determining, for each of the plurality of running flows, the template in the plurality of templates that most closely describes the function of the running flow; and linking each of the plurality of running flows to one of the plurality of templates based on the determination.

6. The computer-implemented method of claim 1, wherein generating the performance report further comprises:

receiving a performance report query from a user of the plurality of users;

generating the performance report based on the generated one or more performance summaries, wherein each of the one or more performance summaries are based on the performance data associated with one or more of the plurality of running flows, wherein at least one of the one or more of the plurality of running flows is associated with the user of the plurality of users; and transmitting the performance report to the user of the plurality of users responsive to receiving the performance report query.

7. The computer-implemented method of claim 1, wherein the system is a multitenancy integration cloud system, and wherein each of the plurality of running flows is allocated a predetermined processing capacity of the system.

8. The computer-implemented method of claim 1, further comprising:

identifying that a first running flow of the plurality of running flows cannot be linked to one of the plurality of templates because the first running flow has a first function that is not described by the plurality of templates; and generating a new template describing the first function of the first running flow, wherein the new template is describing the first function of the first running flow is generated by generalizing an existing template.

9. The computer-implemented method of claim 2, wherein the condition requires two or more of the running flows to be linked to each of the one or more templates to generate the performance summary.

10. A system comprising:
a processor; and
a computer-readable storage medium communicatively coupled to the processor and storing program instructions which, when executed by the processor, cause the processor to perform a method comprising:

obtaining performance data associated with each of a plurality of running flows on a system, wherein each of the plurality of running flows comprises a connected sequence of nodes, wherein each node of the connected sequence of nodes is configured to perform a task, and wherein each of the plurality of running flows is associated with one of a plurality of users;

obtaining a plurality of templates, wherein each template of the plurality of templates describes a function of a flow; linking each of the plurality of running flows to one of the plurality of templates which describes a function of the linked running flow;

generating, for each of one or more templates which describes the function of the linked running flow, a performance summary based on the performance data associated with each of the plurality of running flows linked to the template; and generating a performance report based on the generated one or more performance summaries.

11. The system of claim 10, wherein generating the performance summary further comprises:

determining, for each of the one or more templates, whether a number of running flows linked to the template satisfies a condition based on a predetermined quantity; and generating, for each of the one or more templates, the performance summary based on the performance data associated with each of the plurality of running flows linked to the template, responsive to determining the number of running flows linked to the template satisfies the condition.

12. The system of claim 10, wherein obtaining performance data comprises:

obtaining, for each of the plurality of running flows, one or more selected from the group consisting of:
a latency of the running flow;
a data rate per second of the running flow;

a cost of the running flow; and a time at which the running flow was executed on the system.

13. The system of claim 10, wherein generating the performance report further comprises:

receiving a performance report query from a user of the plurality of users;

generating the performance report based on the generated one or more performance summaries, wherein each of the one or more performance summaries are based on the performance data associated with one or more of the plurality of running flows, wherein at least one of the one or more of the plurality of running flows is associated with the user of the plurality of users; and transmitting the performance report to the user of the plurality of users responsive to receiving the performance report query.

14. A computer program product comprising a computer-readable storage medium having program instructions embodied therewith, the program instructions executable by a processor to cause the processor to perform a method comprising:

obtaining performance data associated with each of a plurality of running flows performed on a system, wherein each of the plurality of running flows comprises a connected sequence of nodes, wherein each node of the connected sequence of nodes is configured to perform a task, and wherein each of the plurality of running flows is associated with one of a plurality of users;

obtaining a plurality of templates, wherein each template of the plurality of templates describes a function of a flow;

linking, each of the plurality of running flows to one of the plurality of templates which describes a function of the linked running flow;

generating, for each of one or more templates which describes the function of the linked running flow, a performance summary based on the performance data associated with each of the plurality of running flows linked to the template; and generating a performance report based on the generated one or more performance summaries.

15. The computer program product of claim 14, wherein generating the performance summary further comprises:

determining, for each of the one or more templates, if a number of running flows linked to the template satisfies a condition based on a predetermined quantity; and generating, for each of the one or more templates, the performance summary based on the performance data associated with each of the plurality of running flows linked to the template, responsive to determining the number of running flows linked to the template satisfies the condition.

* * * * *